United States Patent Office 3,170,552
Patented Feb. 23, 1965

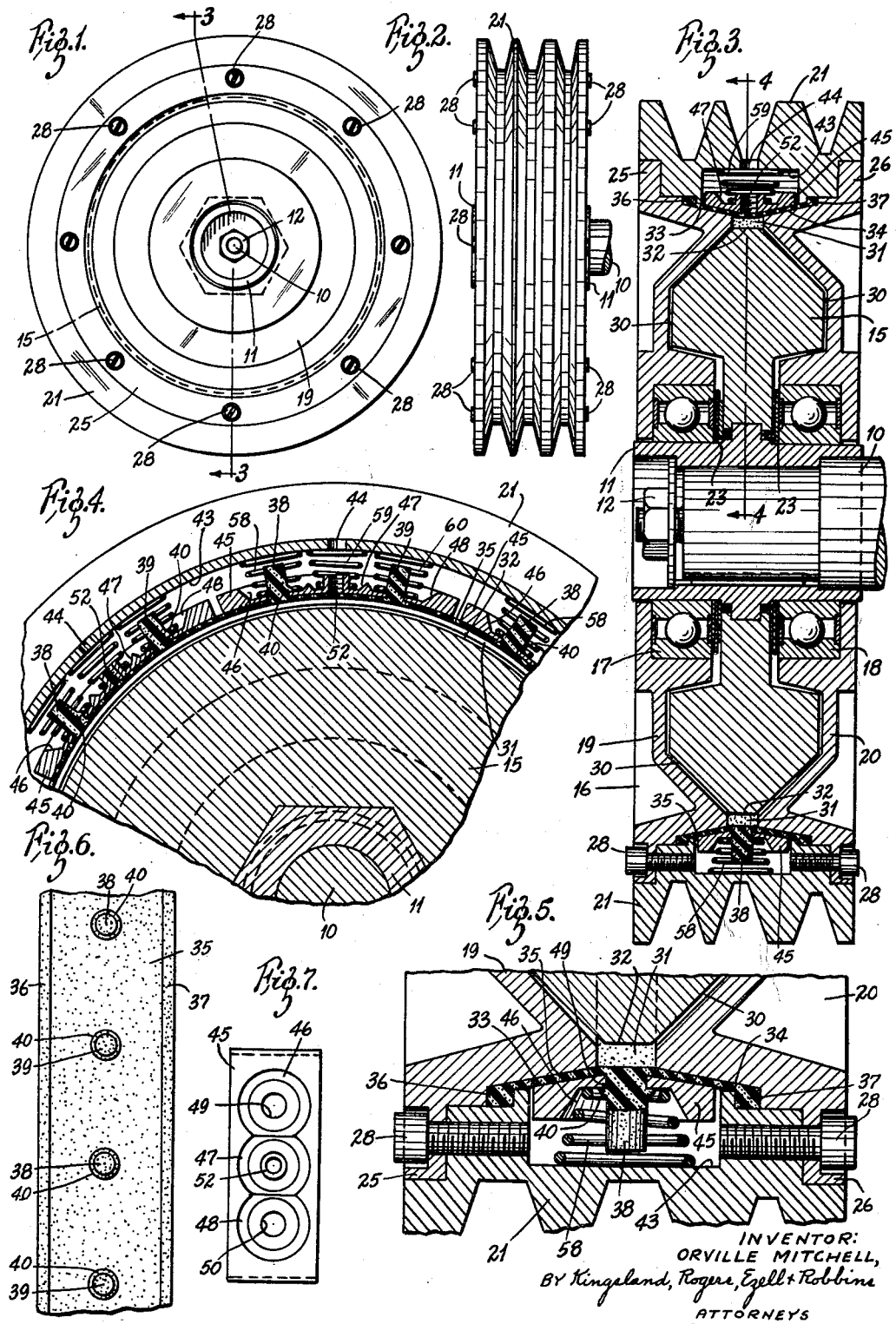

3,170,552
MAXIMUM OUTPUT SPEED FLUID SHEAR
COUPLING
Orville Mitchell, Dallas, Tex., assignor to John E. Mitchell
Company Inc., Dallas, Tex., a corporation of Missouri
Filed June 19, 1961, Ser. No. 118,149
7 Claims. (Cl. 192—58)

The present invention relates to a maximum output speed coupling. It comprises closely spaced driving and driven rotatable members connected my means of a viscous liquid, preferably a silicone oil, that transmits torque from one member to the other to effect a direct drive from the driving to the driven member at low speeds. It also comprises apparatus to permit the liquid to escape from the interfaces of the two members only when the driven member reaches a given speed; and it regulates such escape to cause the escape and reentry of the liquid from the interfaces to produce just enough driving connection between the members to maintain the driven member at its predetermined maximum speed, regardless of whether the driving member exceeds that speed.

The foregoing type of coupling is disclosed in the prior applications of William L. King, Serial No. 801,339, filed March 23, 1959, now abandoned, and Serial No. 78,617, filed December 27, 1960; the present invention constitutes an improvement in those disclosures, that particularly relate to the liquid-escape apparatus.

In the prior applications, the liquid escape is accommodated in a plurality of cylinders disposed around the periphery of the driven member. Each cylinder contains a weight, with a spring to permit the weight to move outward under centrifugal force, whereby to enlarge the cylinder and permit the liquid to escape thereinto from the liquid space between the interfaces of the driving and driven members. The springs set the maximum speed of the driven member, since the departure of liquid from the interfaces permits loss of speed of the driven element, and on increment of such lost speed, in turn, reduces centrifugal force to cause the springs to press the weights inward. The weights thereupon force liquid back into the interface space to increase the torque-transmitting capacity of the coupling and restore the speed of the driven member.

The present apparatus improves over former liquid-escape apparatus in that it greatly reduces the problems of sealing the liquid chamber, and reduces the friction caused by the formerly-used cylinder and counterweight arrangement. Specifically it is an object of the invention to eliminate the multiple individual cylinder-and-seal arrangement; and it is an added object to provide a single sealing element for the entire liquid relief space, with a simple securing arrangement for it. It is a further object to provide weight arrangements having much reduced friction.

Another object of the invention fulfilled by the present arrangement is enabling a smaller diameter coupling to be used, especially in cases where accessory features, such as driving belt grooves, are required around the middle of the driven member. This feature results from a reduction in outer diameter made possible by using an annular liquid relief space instead of a plurality of radially disposed cylinders.

Another object of the invention is to provide an arrangement that permits the use of connecting bolts for the driven members, that can be located outwardly near the rim of the coupling, beyond the liquid-receiving space, where they are not a source of leakage in themselves, and yet do not cause addition to the diameter of the coupling.

Another object of the invention is to provide an expansion and sealing means that affords a liquid relief space that does not require force from the liquid itself as the principal means to produce its expansion.

In the drawing:

FIGURE 1 is a view from one end of the coupling;
FIGURE 2 is a rim or edge view of the coupling;
FIGURE 3 is a transverse section on the line 3—3 of FIGURE 1, somewhat enlarged;
FIGURE 4 is a fragmental section on the line 4—4 of FIGURE 3;
FIGURE 5 is a further enlarged fragmental section similar to the lower part of FIGURE 3;
FIGURE 6 is an outside view of a portion of the sealing strip in flat condition; and
FIGURE 7 is an outside view of one of the weight shoes.

The coupling is shown as mounted upon a shaft and as having belt grooves on its outer periphery, by means of which it can transmit driving force to some other rotatable object.

The driving shaft 10 is here shown as having a reduced end to which a hub sleeve 11 is attached by means of an appropriate nut 12. This hub receives, preferably in the manner shown in the copending application Serial No. 78,617, the rotating driving member 15. As will be understood, the shaft 10, hub 11, and the driving member 15 are all secured so that they rotate together as a unit.

The driven member 16 rotates about two ball bearing sets 17 and 18, the inner races of which are pressed on to the hub or sleeve 11. In this embodiment of the invention, there are two housing members 19, 20 and a rim 21 that make up the primary part of the driven member. As illustrated, the housing members 19 and 20 are identical and are disposed in facing relationship around the driving rotor 15. Each housing member receives an outer race of one of the bearings 17 and 18. Appropriate seals 23 are employed to prevent escape of coupling liquid into the bearing and out of the housing past the bearing.

The outer ports of the housing are provided with flanges 25 and 26, respectively, between which there is formed a circular groove. The rim 21 is fitted into this groove around the periphery of the flanges 25 and 26. Appropriate screws 28 fit through the flanges and into the rim 21 on opposite sides as shown in the bottom of FIGURE 3 and in FIGURE 5.

There is a liquid receiving space 30 between the faces of the driving and driven members. This space extends, first, substantially radially outwardly from adjacent the bearings, then on opposite sides of the driving rotor 15, it extends sharply axially in opposite directions and slightly outwardly. Thereafter, it extends generally radially outwardly again on the opposite sides, and, finally, it tapers radially outwardly and convergingly to a narrow circular space 31. This space 31 is defined by a flattened outer edge 32 on the driving rotor 15 and by side walls formed by the two housing members 19 and 20. The inside surfaces of the two housing members slope axially and slightly outwardly beyond the space 31, as shown at 33 and 34, for a purpose to appear.

The liquid receiving space 30 also communicates with a liquid relief space, the size of which is controlled by a flexible element 35. In the present embodiment, the element 35 comprises a rubber-like, resilient flexible strip formed into a ring. It may be made of one of the molded plastic materials resistant to corrosion in the present environment. At its side edges, the ring 35 has beads 36 and 37 clamped tightly and sealingly by the screws 28 between the two housing elements 19 and 20 and inwardly extending flanges on the rim 21. This is illustrated in FIGURE 5.

The outer side of the ring 35 has a plurality of pairs of spaced bosses 38 and 39. Each boss has an integral collar 40 for a purpose to appear.

Outside of the flexible element 35 the rim member 21 of the coupling is provided with a circular recess 43 extending all the way around it. Spaced openings 44 open the circular recess 43 to the outside air.

There are a plurality of arcuate weight shoes 45 within the space 43 on the outside of the flexible element 35. These shoes are identical and only one need be described. One such is shown in FIGURE 7. On its outer side it has three recesses 46, 47 and 48. The recesses 46 and 48 have central holes 49 and 50 therein. The middle recess 47 contains a threaded boss 52 for a purpose to appear.

The holes 49 and 50 on each shoe 45 are designed to slip over a pair of bosses 38 and 39, respectively, of the ring 35. The collars 40 on the bosses yield to enable the shoes to be installed, but strongly resist their withdrawal. There are enough pairs of bosses 38 and 39 arranged around the outer surface of the sealing element 35 to receive all of the weight shoes, that, in this illustration, are eight in number, the same being so arranged about the sealing ring 35 as to occupy substantially all of the exposed outer surface thereof. The shoes can be removed from the ring for servicing the coupling.

The recesses 46, 47 and 48 are adapted to receive the inner ends of conical coil springs 58, 59 and 60. These springs fit over the several bosses, and at their outer and wider ends engage against the rim 21. They are compression springs and apply a predetermined force urging the sealing ring 35 to its inward position illustrated in FIGURE 3, wherein it maintains the liquid space 30 at its minimum volume.

*Operation*

The coupling is designed to receive silicone liquid preferably of a viscosity from 10,000 to 1,000,000 cs. In this respect, this coupling is the same as that disclosed in application Serial No. 78,617. It will be noted that there is a very small clearance between the faces of the driving and driven elements that form the liquid receiving space 30. The amount of silicone liquid within this space 30 is enough that with the sealing ring 35 inward, it will extend down into the radial space at the base of the outer taper. The exact amount of liquid may be varied within reasonable limits. The volume of the additional relief space provided when the strip 35 is extended into its outer position should be enough to permit all of the liquid to withdraw from contact with the surface of the driving member 15.

The combined force of the springs must be enough to hold the weight shoes 45 inwardly against centrifugal force, until a predetermined speed is reached. When the driven member 16 reaches this critical speed, centrifugal force can start an outward displacement of the weight shoes 45, causing compression of the springs. This speed can be changed by changing the springs.

In operation, a motor, such as the engine of an automobile, may start rotation of the shaft 10 and with it the driving member 15. This causes the silicone liquid to assume a position within the outer part of the liquid space 30; but at this time the springs hold the ring or strip 35 inwardly, as illustrated in FIGURE 3. With the ring 35 inward, there is enough liquid acting on the faces of the driving and driven members to transmit a starting torque to the driven member, and the load to be rotated. Typically, the load may be the equipment driven by the belts at the forward end of an automobile engine.

The starting load or torque required determines the size of the coupling, which involves essentially the amount of surface area of driving and driven members that is connected through the narrow film of the viscous liquid.

One characteristic of this type of coupling is that the liquid transmits torque in shear. Consequently, in contrast with many other types of couplings, there is a drive of the driven member from almost the very start of the driving member, with very little slip. In a conventional liquid coupling or torque converter, the force does not apply shearing stress onto the liquid, but rather develops a force as a result of centrifugal displacement of the liquid. Therefore, the driving member must attain a predetermined speed before the driven member starts. Also in conventional torque converters, the torque transmitted increases with the amount of slip, and so there is a maximum slip at the start in order to overcome the static inertia of the load. All of this is in contrast with the present type of coupling which employs a very narrow liquid space and a viscous liquid such as the silicones mentioned.

As the speed of the driving member reaches a predetermined amount, the centrifugal force acting upon the weights 45 and the liquid (but primarily the weights) causes the weights to move radially outwardly. Being connected to the bosses 38 and 39, the weights 45 pull the ring 35 outwardly also. When this occurs, liquid leaves the space 30 under centrifugal force, and moves into the relief space now provided by withdrawal of the flexible ring 35 from the surfaces 33 and 34. It will be observed that with the design here provided, it is not necessary to stretch the ring 35 materially. The strip 35 is of a shape to permit to assume the position illustrated in FIGURE 3 without substantial distortion, and it can shift to an outward position without requiring more flexing than it has in the position illustrated. This construction minimizes the resistance caused by the flexible wall element, by eliminating external friction between the flexible wall and related parts, and minimizing the flexing of the element itself. The former constructions had resistance factors in operation of the weights that were not always consistent.

At the critical speed substantially all of the silicone liquid is withdrawn from the interfaces between the driving and driven members, leaving insufficient silicone between these interfaces to transmit the torque of the load. It is a characteristic of silicone liquids that when they cannot transmit a load in shear, they break down. Hence, the liquid here breaks down, apparently into a series of tiny balls that actually decrease the friction and act as a lubricant between the driving and driven members. The advantage of this breakdown of the silicone is not merely that it produces the sharply defined critical speed, but also that it eliminates the generation of heat when the slippage occurs between the driving and driven members as will appear.

When all of the liquid has moved away from the driving member 15 or has broken down so that it is ineffective as a coupling agent, which occurs at some critical speed such as 1800 r.p.m., the driven member 16 slows down an increment. When it does so, the springs 58–60 return the weight inwardly by a corresponding increment, thereby causing liquid to be returned into contact with surfaces of the driving member. At this time the latter is rotating at a speed at least incrementally higher than that of the driven member 16. Accordingly, the driving member again gives an impulse of speed to the driven member, bringing it up again to its critical speed at which the silicone coupling liquid withdraws to the relief space. This cycle of action repeats itself, with the result that the driven member continues at the critical speed regardless of the fact that the driving member may continue to increase in speed beyond the speed of the driven member, and yet the driven member will remain at the critical speed.

When, later, the speed of the driving member descends below the critical speed, the silicone will be forced inwardly again by the springs, and the coupling will be re-established so that there is substantially a direct coupling without slip between the two members.

One of the great advantages of the present invention is that the friction is reduced in the centrifugal force-responsive assembly very greatly by the use of the flexible ring element 35. Heretofore, a plurality of cylinders has been used, sometimes each with a sealing diaphragm molded to it, and at other times with sealed pistons operating in the cylinders. In both cases, problems of irregular friction were introduced which made the operation of the coupling less regular and made the critical speed less sharp. Furthermore, with the present arrangement, the sealing of the ring 35 is relatively easy since the screws 28 tightly clamp it into place. It is virtually impossible for the liquid to escape. Yet, it is not ordinarily necessary to vulcanize or otherwise cement the edges of the sealing 35 into place. The clamps are sufficient.

Another advantage is that less radial motion is required with a continuous ring to permit escape of all the liquid than with a plurality of individual cylinders. This permits the coupling to be of smaller outside diameter for a given driving member diameter. This is particularly true at the middle and it enables the middle belt groove to be employed as illustrated in this coupling. This could not be done if there were a plurality of individual release cylinders, since they would have to have a greater radially measured dimension than does the space 43.

Another advantage of the present design is that the connecting screws 28 can be located outside of the liquid space. This gives a better seal and also the bolts themselves are not sources of leakage.

In the assembly of the device, the individual weights with their springs are first put in place on the inner surface of the rim 21. Thumb screws may be inserted through the holes 44 and into the threaded bosses 52. The thumb screws can be drawn tight to compress the springs and locate the weights in their outer positions. The ring 35 is then also held in its outer position. This makes the assembly of the driving member or impeller 15 and the housing elements easier. After assembly, the thumb screws are removed and the breather holes 44 are then available to permit air to move in and out of the receptacle recess 43.

Various changes and modifications may be made within the process of this invention as will be readily apparent to those skilled in the art. Such changes and modifications are within the scope and teaching of this invention as defined by the claims appended hereto.

What is claimed is:

1. In a coupling: a rotary driving member, a rotary driven member coaxial with the driving member, a torque-transmitting liquid between the members; the driven member having relief space around and within it to receive liquid forced centrifugally, a flexible sealing element extending around the driven member across the relief space to form an outer wall therefor and sealed on its sides to the driven member, the relief space being expandible to a size to receive all of the liquid; the flexible element being yieldable outwardly in the relief space between its sealed sides to expand the relief space to receive liquid from between the members, whereby to reduce the torque transmission from the driving to the driven member, and weight means on the driven member and located against the outer side of the flexible element, the weight means being outwardly yieldable in response to a centrifugal force, and resilient means acting inwardly against the weight means and flexible element to urge the flexible element inward to reduce the size of the relief space and to confine the liquid to the space between the driving and driven members when the speed of the driven member is below predetermined speed.

2. The coupling of claim 1, wherein the outwardly yieldable means comprises a plurality of arcuate weight shoes fitting against the outer surface of the flexible element and shaped to substantially cover the outer surface thereof, and yieldable means urging them inwardly.

3. The coupling of claim 2, wherein the flexible sealing element has attaching means to engage and hold the weight shoes onto it.

4. The coupling of claim 3, wherein the sealing element is of molded plastic material with integral bosses projecting outwardly therefrom, and the weight shoes have recesses engaged over the bosses to secure the shoes to the sealing element.

5. The coupling of claim 1, wherein the driving element comprises an inner rotating member and the driven element surrounds the driving member; the driven member comprising opposite facing covers and a perpheral rim, the covers providing opposite facing walls that extend on opposite sides of the driving member, and are spaced axially apart adjacent the outer edge of the driving member to provide an inlet to the relief space and the said walls diverging outwardly from the said inlet, both axially and radially; and terminating in spaced edges, the rim having spaced rim edges attached to the opposite covers at said spaced edges of the covers; the edges of the rim receiving the opposite sides of the flexible element, and clamping them against the edges of the facing covers, the flexible element thus spanning across the relief space, whereby to form a sealed enclosure of the driven member and to effect the seal of the flexible element.

6. The coupling of claim 5, wherein the flexible element has pairs of flexible lugs extending outwardly therefrom at spaced intervals around it, and the outwardly yieldable means includes weight shoes each having pairs of openings engaged onto the pairs of lugs, and springs outwardly of the shoes, acting between the shoes and the driven member to resist centifugal movement of the shoes.

7. The coupling of claim 1, wherein the outer periphery of the driving member tapers outwardly to a narrow edge; and the complementary inner surface of the driven member is correspondingly tapered; and the flexible element extends around the driven member at the apex of the taper.

References Cited in the file of this patent

UNITED STATES PATENTS

| 2,601,076 | Winther et al. | June 17, 1952 |
| 2,629,472 | Sterner | Feb. 14, 1953 |
| 2,738,048 | Douglas | Mar. 13, 1956 |
| 2,879,873 | Spase | Mar. 31, 1959 |
| 2,901,075 | Kiekhaefer | Aug. 25, 1959 |

FOREIGN PATENTS

| 534,492 | Italy | Oct. 17, 1955 |